United States Patent
Carmeli et al.

(10) Patent No.: US 7,016,710 B2
(45) Date of Patent: Mar. 21, 2006

(54) POWER OPTIMIZED REQUEST RESPONSE COMMUNICATION PROTOCOL WITH TIMER MECHANISM TO ENFORCE CLIENT TO GENERATE REQUEST

(75) Inventors: Boaz Carmeli, Misgav (IL); Benjamin M. Cohen, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 09/919,276

(22) Filed: Jul. 31, 2001

(65) Prior Publication Data

US 2003/0027608 A1  Feb. 6, 2003

(51) Int. Cl.
*H04B 1/16* (2006.01)
(52) U.S. Cl. .......................... 455/574; 455/69; 455/522
(58) Field of Classification Search ................ 455/69, 455/522, 574
See application file for complete search history.

(56) References Cited

U.S. PATENT DOCUMENTS

| | | | | |
|---|---|---|---|---|
| 4,817,131 A | * | 3/1989 | Thornborough et al. | 379/106.04 |
| 5,423,045 A | * | 6/1995 | Kannan et al. | 713/322 |
| 6,470,290 B1 | * | 10/2002 | Lee et al. | 702/132 |
| 6,604,045 B1 | * | 8/2003 | Kuroda et al. | 701/202 |
| 6,665,802 B1 | * | 12/2003 | Ober | 713/320 |
| 6,745,937 B1 | * | 6/2004 | Walsh et al. | 235/379 |
| 6,775,687 B1 | * | 8/2004 | Binding et al. | 709/203 |
| 6,775,772 B1 | * | 8/2004 | Binding et al. | 713/171 |

OTHER PUBLICATIONS

Jaap C. Haartsen, Ericsson Radio Systems B.V., (2000) "The Bluetooth System", IEEE Personal Communications, pp. 28-36.

* cited by examiner

*Primary Examiner*—Ahmad F. Matar
*Assistant Examiner*—Rasha S. Al-Aubaidi
(74) *Attorney, Agent, or Firm*—Scully, Scott, Murphy & Presser; Rafael Perez-Pineiro

(57) ABSTRACT

In order to support connectivity requirements for today's pervasive devices, the present invention provides an asymmetric two-way request-response communication protocol in which the end user or application is an active participant in the power management scheme. No power is consumed until a user-initiated client request is made. At that time, the client activates its transceiver and attempts to connect to the server; if it succeeds, it requests information, receives its response, and disconnects again, totally shutting down the transceiver. The server's transceiver always stays in a listening mode and waits for a client request. The protocol does not provide a direct method for the server to send unsolicited messages to the client.

3 Claims, 1 Drawing Sheet

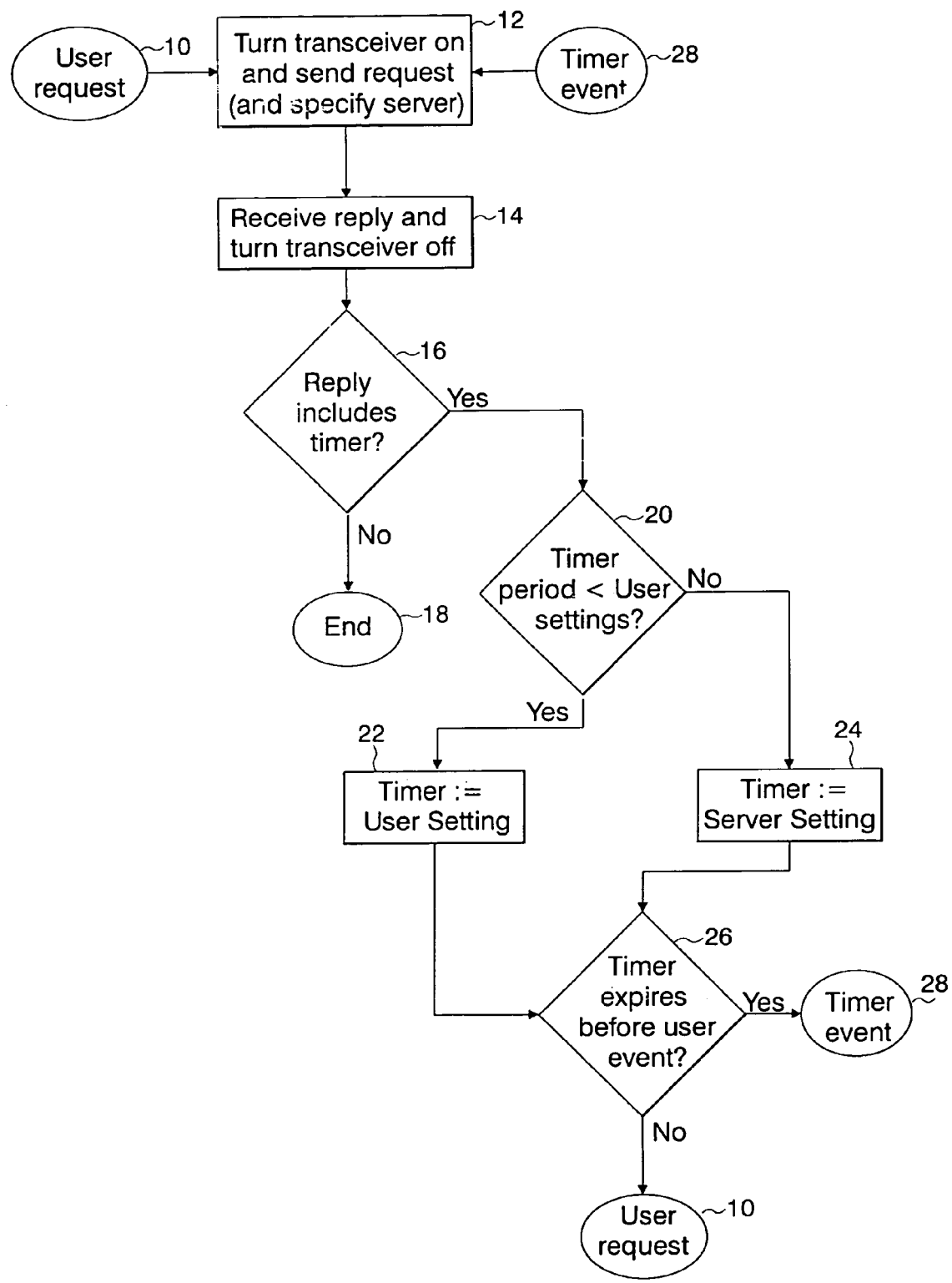

POWER OPTIMIZED REQUEST RESPONSE COMMUNICATION PROTOCOL WITH TIMER MECHANISM TO ENFORCE CLIENT TO GENERATE REQUEST

BACKGROUND OF THE INVENTION

1. Field of the Invention

The present invention relates generally to wireless communications devices and technologies, and more particularly pertains to a communications protocol for small hand-held wireless devices that effectively minimizes the power consumption of the hand-held wireless devices. More particularly, the present invention relates to a power optimized request response communication protocol which provides a natural protocol that allows a user device to make tradeoffs between power consumption and other scarce and expensive resources and functions (e.g. bandwidth, transmission range, latency, etc.).

2. Discussion of the Prior Art

Today's communications protocols were generally not designed specifically to support small, limited power, wireless, mobile devices. In particular, they do not give the user effective control over power consumption.

Existing communications protocols for mobile client devices, such as pagers, use synchronized time slots to wait for unsolicited messages from a server. In such protocols, the client goes into a low power mode from which it is periodically woken up to listen for server messages. This monitoring process often consumes power continuously, because it is implemented at the network level with no convenient user or application control to permit intelligent tradeoffs between power consumption and frequency of polling.

The following is a brief description of the main activities in prior art wireless communications along with their advantages and disadvantages with respect to power consumption.

The IEEE 802.11 committee has defined a standard for Wireless LAN [IEEE 802.11, "Wireless LAN Medium Access Control (MAC) and Physical Layer (PHY) Specifications", November 1997]. The standard supports both ad-hoc networking, in which peer nodes communicate directly, and infrastructure networking, in which nodes called access points (AP) are interconnected over a distribution system. Wireless LAN implementations require continuous connection to the network and are, therefore, inefficient in power utilization. Although power conservation modes exist, even advanced implementations can only work up to 12 hours using of the shelf battery before recharging is needed. Another disadvantage is that Wireless LAN (WLAN), devices are very expensive and large in size, hence are not suitable for small hand-held devices.

Bluetooth is a standard for low-cost, low-power, radio frequency connectivity for various devices, such as PDAs, cellular phones, and other cost-sensitive information appliances [J. C. Haartsen, "The Bluetooth Radio Sytem", IEEE Personal Comm., February 2000, pp. 28–36]. Bluetooth was originally designed to enable mobile devices, in proximity with each other, to establish an ad-hoc cell called picocell and exchange information. In summary, the high frequency hopping (FH) rate, the need for synchronization between master and slave, and other design problems limit the ability to achieve really low power consumption using the Bluetooth standard.

Mobile Telephone Systems are widely used all over the world. The penetration of cellular phones into the marketplace has been incredibly fast and continues to grow. MTS is a Wide Area Network (WAN) in nature and it is meant to be able to supply coverage for wide areas with an assumed distance of a few thousand meters between the mobile unit and the base station [W. C. Y Lee, "Mobile Cellular Telecommunications Systems", McGraw-Hill, N.Y., 1989]. In summary, the need for a circuit switched network for best support of voice, and the need to continuously listen for incoming calls, in addition to the assumption about the distance between the access point and the mobile device, do not allow the proposed power conservation scheme particularly not to totally shut of the client transceiver.

SUMMARY OF THE INVENTION

Accordingly, it is a primary object of the present invention to provide a power optimized request response communication method and protocol which allows a user to make tradeoffs between power and other scarce and expensive resources and functions (e.g. bandwidth, transmission range, latency, etc.).

The present invention provides an asymmetric two-way request-response communication protocol in which the end user or client transceiver is an active participant in the power management scheme. No power is consumed until a user-initiated client request is made. At that time, the client activates its transceiver and attempts to connect to the server; if it succeeds, it requests information, receives its response, and disconnects again, totally shutting down the transceiver.

The server's transceiver always stays in a listening mode and waits for a client request. The protocol does not provide a direct method for the server to send unsolicited messages to the client. However, indirectly the server can set the client to send a request after a time-out period, if no other request is generated due to user interaction. This has the effect of an unsolicited message passing. This allows the application designer to control how often to update client information, thereby controlling the client's power consumption, since power consumption is related to communication intervals. If user customization is provided, a user can override the application settings, and set different time periods; thereby giving the user control over power consumption.

This solution provides a method of power management that is superior to existing protocols because it establishes a natural correspondence between user requests and transmit/receive power consumption. With appropriate feedback on remaining power on the device, the user can learn to manage use of the scarce power resource. Such feedback can even supply the number of interactions still available for the user. Given the known timer interval set by the user, an 'until-when' parameter can be displayed, specifying the time or date until which the device can still operate. This will also allow the user to increase a default timer setting to achieve a longer working period. The extension allows an application to use a timer service to send a poll request, allows the protocol to be either server or client driven, within timing established by the user or by the application designer, which can in turn consider power and critical resources (i.e. bandwidth, latency).

The present invention allows better usage of small, power limited devices by introducing an efficient power conservation protocol. Use of the subject invention makes wireless pervasive devices more practical by extending their 'listen' time and can contribute to the proliferation of pervasive devices with wireless connections.

The present invention can be widely used in the many new, small wireless and mobile communications devices being created, and in the wide variety of systems being built to support them and provide them with content.

The power consumption method and protocol of the present invention has application to many small portable wireless devices such as powered badges, wireless toys, wireless sensors, wireless information access devices, digital cell phones, WAP phones, 2-way pagers, interactive remote controls, personal digital assistants, laptops and other mobile computers, intelligent objects and other pervasive devices.

An interactive remote control protocol and context awareness can greatly expand the utility of the present invention. For example, if a request for information from a user transceiver was received by several nearby server transceiver devices, such as a TV set, an information Kiosk and a soda vending machine, the protocol can provide the user with a choice about which server transceiver device should be addressed in a universal interactive remote control protocol.

BRIEF DESCRIPTION OF THE DRAWINGS

The foregoing objects and advantages of the present invention for a power optimized, request response communication protocol with timer mechanism to enforce client to generate request may be more readily understood by one skilled in the art with reference being had to the following detailed description of several preferred embodiments thereof, taken in conjunction with the accompanying drawings wherein:

The FIGURE illustrates a logic flow diagram for a preferred embodiment of a power-optimized, asymmetric two-way request-response communication protocol or method for providing communication between at least one client transceiver and at least one server while providing power management and conservation of power at the client transceiver.

DETAILED DESCRIPTION OF THE DRAWINGS

The Figure illustrates a logic flow diagram for a preferred embodiment of a power-optimized request response communication protocol with timer mechanism to enforce client to generate request. The logic flow diagram illustrates an asymmetric two-way request-response communication protocol or method for providing communication between at least one client transceiver and at least one server while providing power management and conservation of power at the client transceiver.

The client transceiver is maintained in a power-off state until the client transceiver initiates a request at 10 for a communication with the server and enters a power-on state at 12. The server transceiver transmits the requested information to the client transceiver which receives the requested information, and then returns to a power-off state at 14. The server reply can specify a time-out period at 16, and if not, the procedure ends at 18.

The server transceiver stays in a listening mode and waits for a client request for information, and the server transceiver does not transmit unsolicited messages to the client transceiver.

If the client transceiver has a time-out period, and the time-out period expires before another user request for transmission at 26, then a timer event at 28 initiates the transmission of a communication to the server.

If the user/application specifies a time-out period, then at 20 the client transceiver checks if the server specified time-out period is less than the user/application-specified time-out period. If not, the time-out period is set to the server-specified time-out period at 24. If yes, the time-out period is set to the user/application-specified time-out period at 22. With either the server-specified or the user/application-specified time-out period, if the time-out period expires before another user request for transmission at 26, then a timer event at 28 transmits a request to the server. If the time-out period has not expired, the user can initiate a further request at 10.

In alternative embodiments, the client can define the time-out period, or the server can define the time-out period or the user/application can define the time-out period. In different embodiments, the user can override the time-out period defined by the server and set a different time-out period, or the server can override the time-out period defined by the user and set a different time-out period.

The method can also employ an interactive remote control protocol wherein the client transceiver can communicate with one of a plurality of different servers and the client selects one of the pluralities of servers that replied to the client transceiver request for information. This option is indicated in parentheses in block 12.

Prototype System

A working prototype has been implemented based on a simple narrow band transceiver. The transceiver has a serial interface through which it receives data that is being sent from the device to the air interface and transfers information received from the air interface back to the device. The transceiver is connected to a device through the serial interface. For Server, another transceiver is connected to one of the PC's COM ports.

The protocol works as follows:
1. Create new frame for each user information request.
2. Turn on the transceiver and send the frame as a broadcast frame toward the server.
3. The server's response is sent back to the client.
4. Upon receiving an error free response from the server, the client turns off its transceiver. If no response is received within the time out period, the client resends the request.

Use of Current Prototype

The prototype system's client device is very efficient in its power consumption because the client shuts down its transceiver immediately after receiving a response from the server. The client device, working on a small off-the-shelf battery, was able to receive about 10 MB of data from the server. It is estimated that such amount of data will take a typical application a month or more to utilize.

One embodiment of such client is a Smart Card form factor device with a touch screen, a simple and inexpensive microcontroller, and a transceiver. A good power conservation scheme is essential for mass deployment in the consumer market. Ideally a device could operate for months without battery replacement, or even completely without a battery using solar cells for example.

While several embodiments and variations of the present invention for a power optimized request response communication protocol with timer widget to enforce client to generate request are described in detail herein, it should be apparent that the disclosure and teachings of the present invention will suggest many alternative designs to those skilled in the art.

The invention claimed is:

1. An asymmetric, two-way request-response communication method for providing communication between a client transceiver and a server transceiver, the method comprising the steps of:

maintaining the client transceiver in a power-off state for a defined length of time;

maintaining the server transceiver in a listening mode;

the client transceiver switching from the power-off state to a power-on state and initiating a client communication with the server transceiver, said client communication requesting information from the server transceiver;

the server transceiver receiving said request, and in response to receiving said request, the server transceiver sending to the client transceiver a server communication including the requested information:

if the client transceiver receives said server communication, the client transceiver than switching back to the power-off state;

providing the client transceiver with a timer having a time-out period;

if the client transceiver does not receive said server communication within said time-out period, the client transceiver then resending said client communication to the server transceiver;

when said time-out period ends, the client transceiver entering the power-on state and transmitting a client communication to the server transceiver;

wherein the step of providing the client transceiver with a timer having a time-out period includes the steps of:
  i) providing the client transceiver with a default time-out value,
  ii) the server transceiver providing the client transceiver with a server provided time-out value in the server communication,
  iii) the client transceiver comparing the default time-out value with the server provided time-out value and, on the basis of the comparison, selecting one of said values as the time-out period,
  iv) a user of the client transceiver providing a user specified value for the time-out period,
  v) at first times, the user of the client transceivers overriding the server specified time-out value, and setting the time-out period to a different time-out value, and
  vi) at second times, the server overriding the user specified time-out value, and setting the time-out period to a different time-out value;

wherein the step of the client transceiver initiating a client communication includes the step of said client transceiver communicating the request for information with a plurality of different servers; and the step of the server transceiver sending to the client transceiver a server communication includes the steps of:
  i) each of said plurality of different servers replying to the client request for information, and
  ii) the client transceiver selecting one of said plurality of different servers to be addressed in an interactive remote control protocol.

2. A method according to claim 1, wherein the client transceiver is part of a client having a touch screen, and comprising the further steps of:

providing feedback to the user on remaining power on the client transceiver;

said feedback supplying a number of interactions still available for the user on the client transceiver;

displaying a parameter, determined based on the user specified value for the time-out period, specifying a time or date until which the client transceiver can still operate;

the user, based on said displayed parameter, increasing the user specified value for the time-out period to achieve a longer working period for the client transceiver.

3. A method according to claim 2 for use with a multitude of clients consisting of powered badges, wireless toys, wireless sensors, wireless information access devices, digital cell phones, WAP phones, two-way pagers, interactive remote controls, personal digital assistants, and mobile computers.

* * * * *